US 7,145,460 B1

(12) United States Patent
Wojciechowski et al.

(10) Patent No.: US 7,145,460 B1
(45) Date of Patent: *Dec. 5, 2006

(54) DATA TAPE STORAGE CARTRIDGE WITH REMOVABLE PANEL MOUNTED TRANSPONDER

(75) Inventors: Matthew P. Wojciechowski, Westminster, CO (US); William T. Veno, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 209 days.

This patent is subject to a terminal disclaimer.

(21) Appl. No.: 10/878,890

(22) Filed: Jun. 28, 2004

Related U.S. Application Data

(63) Continuation-in-part of application No. 10/746,064, filed on Dec. 26, 2003.

(51) Int. Cl.
*G08B 13/14* (2006.01)

(52) U.S. Cl. ............................... 340/572.8; 340/572.1; 360/134

(58) Field of Classification Search ............. 340/572.1, 340/572.8, 572.7; 343/720; 235/381, 487; 360/134, 69; 206/313, 807; 242/348, 344
See application file for complete search history.

(56) References Cited

U.S. PATENT DOCUMENTS

| 4,692,746 | A | * | 9/1987 | Budin et al. | 340/572.5 |
|---|---|---|---|---|---|
| 5,424,526 | A | | 6/1995 | Leonhardt et al. | |
| 5,971,281 | A | | 10/1999 | Frary et al. | |
| 6,081,857 | A | | 6/2000 | Frary | |
| 6,201,474 | B1 | | 3/2001 | Brady et al. | |
| 6,204,982 | B1 | * | 3/2001 | Larsen et al. | 360/60 |
| 6,226,688 | B1 | | 5/2001 | Frary | |
| 6,304,416 | B1 | | 10/2001 | McAllister et al. | |
| 6,466,990 | B1 | | 10/2002 | Frary | |
| 6,614,750 | B1 | * | 9/2003 | Weber et al. | 720/718 |
| 6,739,515 | B1 | * | 5/2004 | Wallace | 235/492 |
| 6,865,047 | B1 | * | 3/2005 | Maekawa et al. | 360/69 |

* cited by examiner

*Primary Examiner*—Anh V. La
(74) *Attorney, Agent, or Firm*—Brooks Kushman P.C.

(57) ABSTRACT

A data tape storage cartridge for a data storage system that has a transponder for reading and writing data. The data storage tape cartridge includes a housing having a window and at least one wall. A panel is retained on the housing and configured to cover the window. A retainer is provided on the panel for the transponder. The transponder functions as an identification tag to which data is written and from which data is read to identify the data storage tape cartridge. The removable panel may also include a write protect switch that may be actuated to prevent a tape from being overwritten.

13 Claims, 3 Drawing Sheets

DATA TAPE STORAGE CARTRIDGE WITH REMOVABLE PANEL MOUNTED TRANSPONDER

CROSS-REFERENCE TO RELATED APPLICATIONS

This application is a continuation-in-part of U.S. application Ser. No. 10/746,064 filed Dec. 26, 2003.

BACKGROUND OF THE INVENTION

1. Field of the Invention

The present invention relates to a data storage tape cartridge having a housing within which a transponder is secured for identification of the cartridge.

2. Background Art

Tape cartridges provide a practical and economical mechanism for long-term data storage. Tape cartridges have one or two reels on which a data storage tape is wound. Data storage tapes are comprised of a flexible web on which a coating is applied that records information caused by changes in magnetic fields, exposure to light, and the like. A data storage tape cartridge is inserted into a tape drive to allow data to be written to, or read from, the data tape.

Single hub cartridges are accessed by a tape drive as the tape is withdrawn from the cartridge and pulled along a tape path across at least one read/write head. After the tape is accessed, it may then be rewound onto the cartridge and returned to storage. Tape cassettes are cartridges that generally include two hubs. Tape is wound between the two hubs and pulled across a read/write tape head.

Data storage tape cartridges must be identified in some way so that the contents of the tape can be identified. One type of information about tape cartridges that may be used for identification is information relating to the type of data stored on the tape. Such information can include a list of files stored on the tape, the time and date of data storage, expiration dates, file ownership information, and the like. Another type of information that may be used for identification regarding each tape cartridge includes information about the cartridge itself such as the serial number of the tape, type of cartridge, type of tape, cartridge manufacturer information, and the like. Another type of information about a cartridge may be tape cartridge history information. An example of tape cartridge history information may include the number of times the cartridge has been loaded onto a tape deck, the number of cartridge read/write operations, the age of the cartridge, access error data, and the like.

Cartridge identification information may be simply provided as a visually readable label, a bar code tag, a radio frequency tag, or a transponder. Visually readable tags are not well suited for large automated tape libraries. Bar code labels are not rewriteable and can only provide a limited amount of information. A radio frequency tag or transponder may include a dynamic memory that may be accessed by a radio frequency read/write unit when the transponder tag is placed in close proximity to the reader. Transponders may include substantial memory that can be either permanent or read/write memory depending upon the type of information to be stored on the transponder tag. Examples of radio frequency tags and radio frequency readers for use in tape cartridges are disclosed in U.S. Pat. Nos. 5,971,281; 6,081,857; 6,226,688; and 6,466,990.

One disadvantage of radio frequency identification (RFID) tags is that they are normally permanently affixed within the tape cartridge. A RFID tag that is assembled to the inside of a tape cartridge cannot be easily upgraded. If the RFID tag is located inside the cartridge, it must be inserted during assembly of the cartridge and cannot be accessed without disassembly of the cartridge. With this type of RFID tag system, it is not possible to change the write protected data on the RFID chip. Mounting the RFID chip inside the housing of a tape storage cartridge reduces design flexibility. In addition, if the RFID tag becomes inoperative for any reason, it is necessary to disassemble the tape cartridge to replace the RFID chip.

One example of a tape storage cartridge having a RFID tag is disclosed in U.S. Pat. No. 6,304,416. This patent discloses the concept of providing a RFID tag that is mounted at a 45° angle relative to two sides of a data tape storage cartridge. The data storage tape cartridge disclosed in this patent requires assembly of the RFID tag chip when the tape storage cartridge is initially assembled. The 45° orientation of the RFID tag permits the RFID tag to be accessed through one of two different walls of the data storage tape cartridge. While this design provides a dynamic RFID tag system that may be accessed to update the RFID tag memory with additional files, fields, or other data, if the RFID tag becomes inoperable it is necessary to disassemble the tape cartridge to obtain access to the RFID tag.

Tape cartridges may include a write protect switch that may be used to either inhibit or permit data to be written to the data storage tape. If the write protect switch is in the locked position, it is not possible to write to or erase the data storage tape. If the write protect switch is in the unlocked position, the tape may be freely accessed and read/write operations may be performed on the data storage tape. Write protect switches are normally secured to the tape storage cartridge and are assembled to the cartridge when the cartridge is initially assembled. If the write protect switch is non-functional or becomes broken in the course of normal use, the cartridge must be disassembled or replaced by another cartridge. Applicants' assignee developed a Red-Wood model storage cartridge that included a write protect switch on a removable portion of the data storage cartridge. While this design permitted separate assembly and replacement of the write protect switch, it did not disclose or suggest the concept of providing a transponder or RFID tag for the tape storage cartridge. The mechanical ID used with the RedWood system was a mechanical ID tag that was limited to identification of the tape cassette by a gap/no gap pin spring system. The RedWood data storage tape cartridges also could include bar codes and human readable labels depending upon a customer's requirements.

These and other problems and disadvantages of the prior art data storage tape cartridge ID systems is addressed by Applicants' invention as summarized below.

SUMMARY OF THE INVENTION

According to one aspect of the present invention, a data tape storage cartridge for a data storage system is provided that has a transponder for reading and writing data. The cartridge comprises a housing having a window in at least one wall and at least one reel rotatably mounted in the housing. A length of data tape is wound on the reel on which data is recorded. A panel is retained on the housing and is configured to cover the window in the housing. A retainer is provided on the panel for the transponder. The transponder functions as an identification tag to which data is written from and from which data is read.

According to other aspects of the invention, the window and the panel have cooperating elements that engage each other to selectively secure the panel to the window. The cooperating elements may comprise first and second sets of sliding surfaces that retain the panel to cover the window and hold the panel in a flush relationship relative to the at least one wall of the housing. Locking cams may be provided on at least one portion of the panel that engage the housing to lock the panel to the housing.

According to other aspects of the invention relating to the transponder, the panel may have integrally molded retaining members facing an inner portion of the housing that retain the transponder inside the housing when the panel is secured to the window. The transponder may further comprise an integrated circuit chip having an antenna that is used to access a memory device. The panel and transponder are selectively removable from the housing as a unit and the transponder may be replaced in the panel with an interchangeable transponder.

According to another aspect of the invention, a tape cartridge for a data storage tape is provided for a tape drive system. The tape drive system has a communication link that reads and writes data to a transponder. The tape cartridge comprises a housing and a tape reel rotatably contained within the housing. A length of data storage tape is wound on the tape reel. Data may be stored on the data storage tape for later retrieval. A panel is secured to the housing in a selectively removable relationship relative to the housing. The panel has a retainer for retaining the transponder and also supports a write protect switch that may be actuated to prevent a tape from being overwritten or erased.

According to other aspects of the invention, the write protect switch may comprise a manual slide switch that is manually moved between a write position and a write protect position.

According to other aspects of the invention, a first set of surface features may be provided on the panel that cooperate with the second set of surface features on the housing to selectively retain the panel on the housing. The first set of surface features may comprise a pair of steps in opposed side walls of the panel. The second set of surface features may comprise a pair of spaced ribs formed in the housing along which the steps in the opposed side walls of the panels are permitted to slide as the panel is inserted and removed from the housing. The first set of surface features may further comprise a cam ramp having a locking edge, while the second set of surface features further comprise a locking lip over which the cam ramp moves until the locking lip engages the locking edge. The transponder may be retained by the panel in an orientation wherein the transponder communicates through a single wall of the panel with the communication link of the tape drive system.

These and other aspects of the present invention will be better understood in view of the attached drawings and following detailed description of a preferred embodiment of the invention.

DETAILED DESCRIPTION OF THE PREFERRED EMBODIMENT(S)

Figure 1:
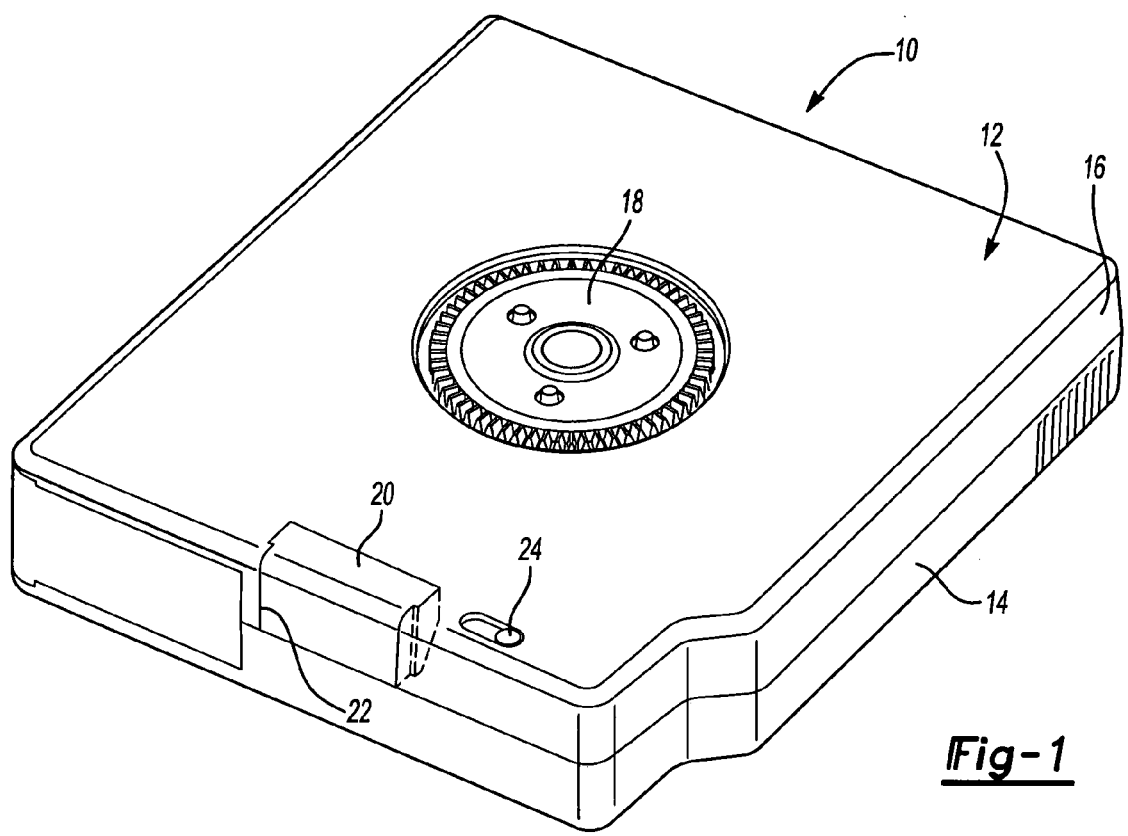
FIG. 1 is a perspective view of a data storage tape cartridge made according to the present invention.

Referring to FIG. 1, a data storage tape cartridge is generally referred to by reference numeral 10. The data storage tape cartridge comprises a housing 12 having a top portion 14 and a base portion 16. As shown in FIG. 1, the data storage tape cartridge 10 is inverted in a bottom-up orientation to better see the base portion 16. A hub 18 is accessible through the base portion 16. Tape (not shown) is wound around the hub 18 on which data is stored. A removable panel 20 is installed in a window 22 provided in the base portion 16 of the housing 12. It should be understood that the removable panel 20 and window 22 could be provided in the top portion 14 or partially within the top portion 14 and base portion 16. A write protect switch 24 may also be provided on the housing 12 in the base portion 16, as shown. The write protect switch 24 may be moved between a first position in which data may not be written to the tape, and a second position in which data may be written to the tape.

Figure 2:
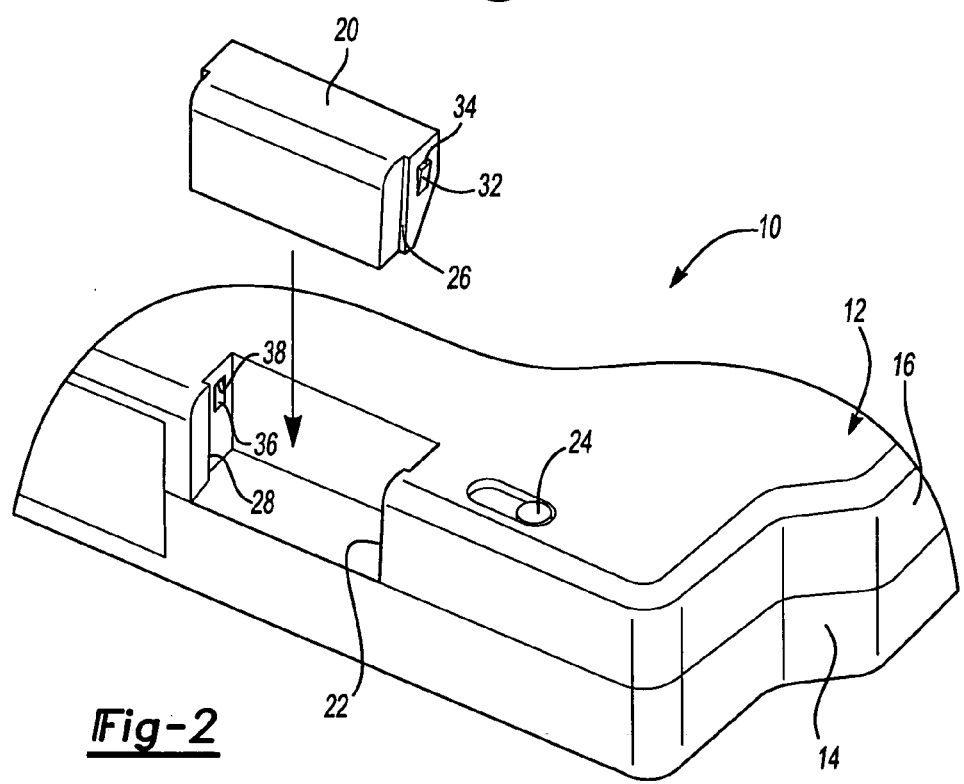
FIG. 2 is a fragmentary perspective view of the data storage tape cartridge shown in FIG. 1 with a removable panel removed therefrom.

Referring to FIG. 2, a portion of the data storage cartridge 10 is shown with part of the housing 12 broken away to better illustrate the relationship of the removable panel 20 to the window 22. The housing as a top portion 14 and base portion 16. Steps 26 formed on the removable panel 20 cooperate with ribs 28 formed in the window 22. The steps 26 and ribs 28 function as sliding surfaces as the removable panel 20 is inserted in and removed from the window 22. A locking cam comprising a shallow triangular shaped protrusion having a locking lip 34 may be provided on both sides of the removable panel 20. A recess 36 is formed on the window 22 that defines a locking edge 38. When the removable panel 20 is placed in the window 22, it is guided by the sliding surfaces formed by the steps 26 and ribs 28. Locking cam 32 is received in the recess 36 so that the locking lip 34 engages locking edge 38 to securely retain the removable panel 20 in the window 22.

Referring to FIG. 2, a portion of the data storage cartridge 10 is shown with part of the housing 12 broken away to better illustrate the relationship of the removable panel 20 to the window 22. The housing as has a top portion 14 and base portion 16. Steps 26 formed on the removable panel 20 cooperate with ribs 28 formed in the window 22. The steps 26 and ribs 28 function as sliding surfaces as the removable panel 20 is inserted in and removed from the window 22. A locking cam comprising a shallow triangular shaped protrusion having a locking lip 34 may be provided on both sides of the removable panel 20. A recess 36 is formed on the window 22 that defines a locking edge 38. When the removable panel 20 is placed in the window 22, it is guided by the sliding surfaces formed by the steps 26 and ribs 28. Locking cam 32 is received in the recess 36 so that the locking lip 34 engages locking edge 38 to securely retain the removable panel 20 in the window 22.

Figure 3:
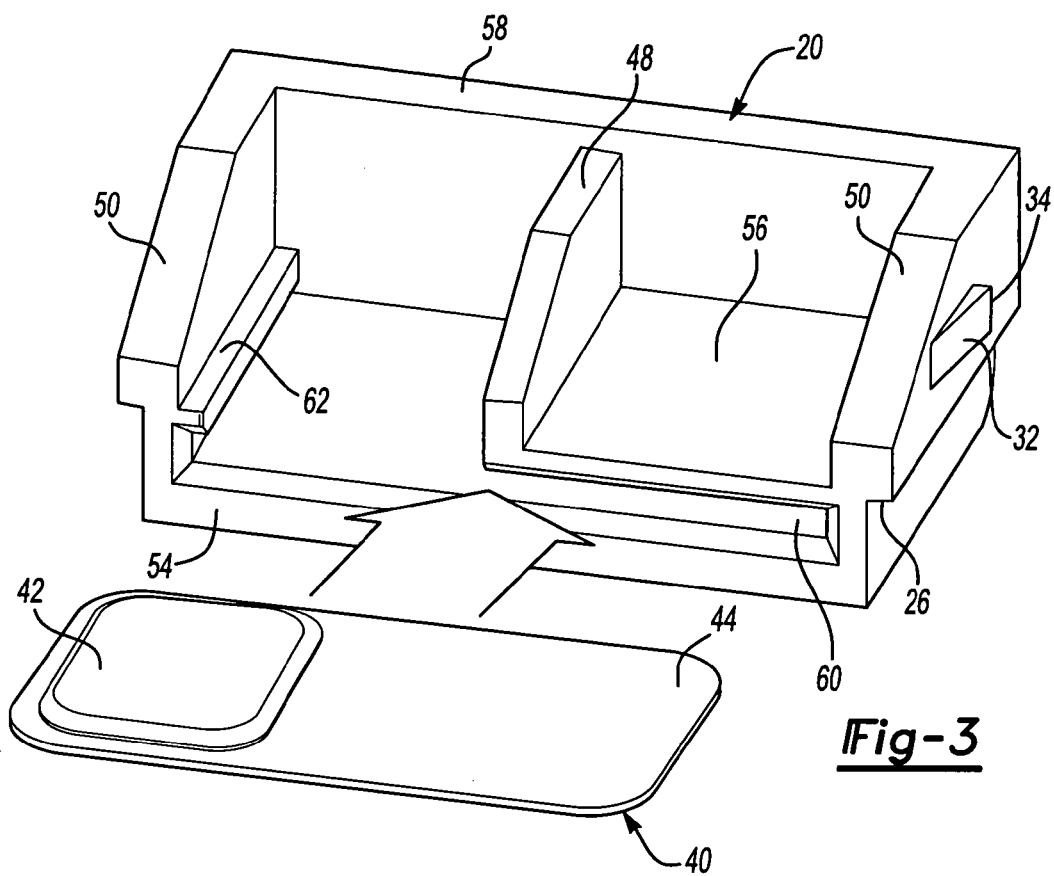
FIG. 3 is a perspective view of a transponder and the removable panel shown separated from each other, but in position for assembly together.

Referring to FIG. 3, the transponder 40 may be assembled to the panel 20 by sliding the transponder 40 with the microprocessor chip 42 being received between the rib 62 and flange 48. A portion of the antenna 44 that extends outwardly from the microprocessor chip 42 is received in the slot 60 between the backing wall 56 and face wall 54. In this way, the antenna 44 is oriented for communication with the transmitter/receiver of a data storage tape system through one wall of the removable panel 20.

Figure 4:
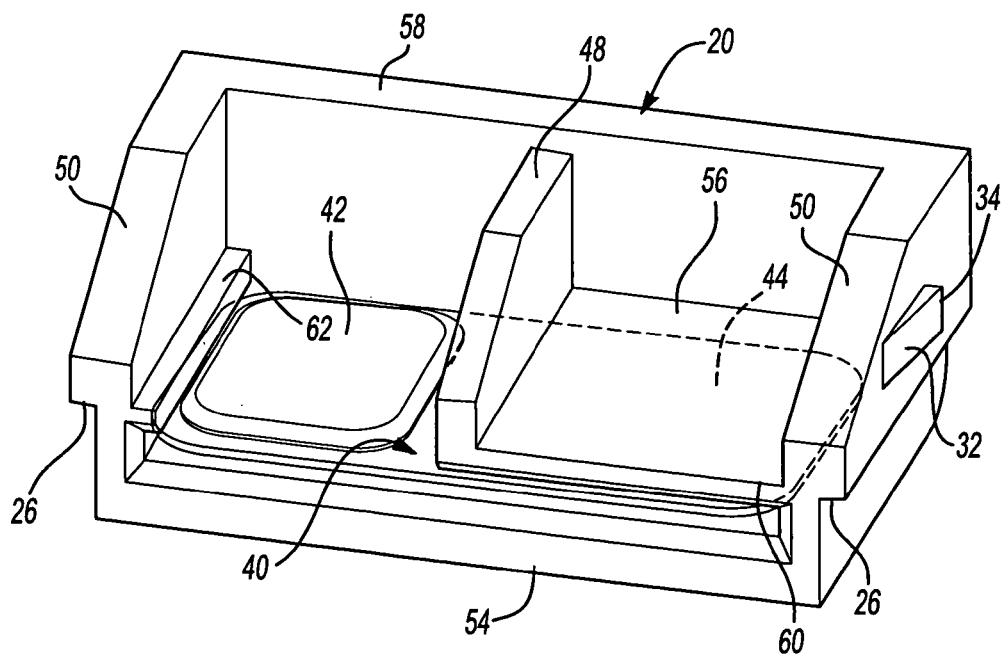
FIG. 4 is a perspective view of the removable panel and the transponder shown assembled together.

As shown in FIG. 4, the transponder 40 is installed in the removable panel 20. The removable panel 20 is ready for assembly to a data storage tape cartridge 10 as previously described with reference to FIGS. 1 and 2.

Figure 5:
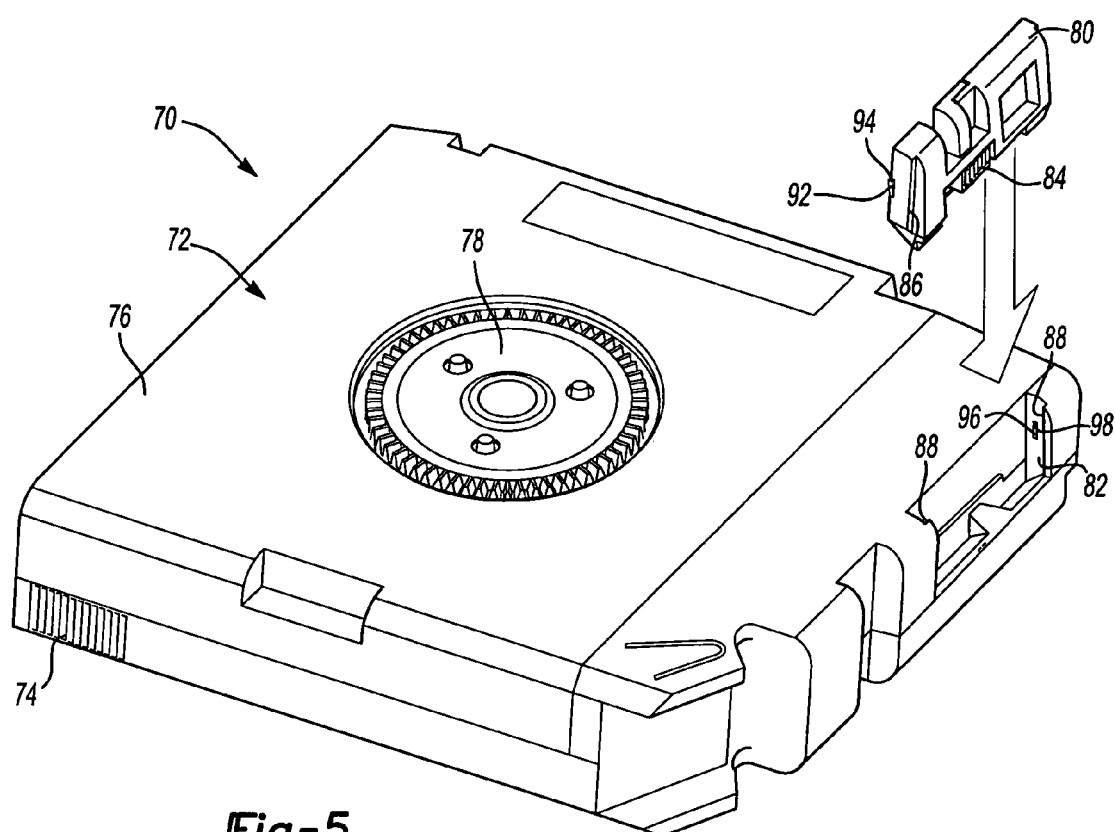
FIG. 5 is a perspective view of an alternative embodiment of a data storage tape cartridge having a removable panel including a transponder and a write protect switch shown disassembled from the tape cartridge.
Figure 6:
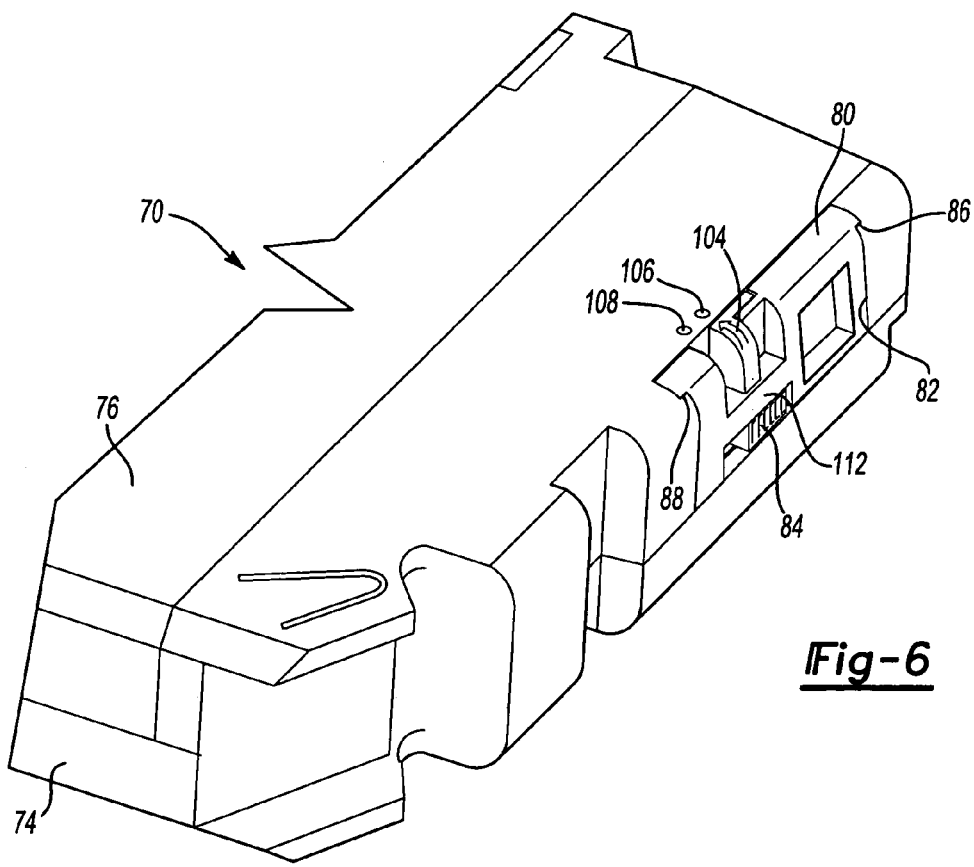
FIG. 6 is a fragmentary perspective view of a data storage tape cartridge having the removable panel including a write protect switch and transponder shown attached to the tape cartridge.

An alternative embodiment of the invention is shown in FIGS. 5 and 6. A data storage tape cartridge 70 is illustrated in FIG. 5 and fragmentarily shown in FIG. 6. The data storage tape cartridge 70 includes a housing 72 having a top portion 74 and a base portion 76. A hub portion 78 is visible through the base portion 76. A removable panel 80 is received in a window 82 formed in the base portion 76 of the housing 72. Window 82 could be formed in other portions of the housing 72 as previously indicated. A write protect switch 84 is supported by the removable panel 80. The write protect switch 84 can be incorporated in the panel 80 to simplify assembly of the data storage tape cartridge 70. The removable panel 80 has steps 86 formed on its opposite sides that are received in a sliding relationship with ribs 88 formed on the sides of the window 82. A locking cam 92 having a locking lip 94 may be formed on opposite sides of the panel 80. Corresponding recesses 96 that each define a locking edge 98 may be provided in the window 82. The locking cam 92 is received within the recess 96 so that the locking lip 94 interlocks with the locking edge 98.

Referring to FIG. 6, the cartridge 70 comprising the top portion 74 and base portion 76 is shown in greater detail. The removable panel 80 is shown installed in the window 82 formed in the base portion 76 of the cartridge 70. The write protect switch 84 is shown to include a pointer 104 that points to either a locked position indicator 106 or an unlocked position indicator 108. The panel 80 includes a slot or pocket for receiving a transponder (not shown) in a manner similar to that described and illustrated with reference to FIGS. 3 and 4. The write protect switch 84 is assembled to the panel 80 with the indicator 104 and switch 84 being guided for sliding movement on a rib 112 that extends transversely across the portion of the removable panel 80. The write protect switch 84 includes a gap/no gap pin spring system (not shown) that enables or disables the data storage tape cartridge 70 from being overwritten.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data tape storage cartridge for a data storage system that has a transponder for reading and writing data, comprising:
   a housing having a window in at least one wall;
   at least one reel rotatably mounted in the housing;
   a length of data tape wound on the reel;
   a selectively removable panel retained on the housing and configured to cover the window; and
   a retainer provided within the panel for receiving the transponder, the transponder being selectively removable from the panel, wherein the transponder functions as an identification tag to which data is written and from which data is read.

2. The data tape storage cartridge of claim 1 wherein the window and the panel have cooperating elements that engage each other to selectively secure the panel to the window.

3. The data tape storage cartridge of claim 2 wherein the cooperating elements are first and second sets of sliding surfaces that retain the panel to cover the window and hold the panel in a flush relationship relative to the at least one wall of the housing.

4. The data tape storage cartridge of claim 1 wherein locking cams are provided on at least one portion of the panel that engage the housing to lock the panel to the housing.

5. The data tape storage cartridge of claim 1 wherein the panel has integrally molded retaining members facing an inner portion of the housing that retain the transponder inside the housing when the panel is secured to the window.

6. The data tape storage cartridge of claim 1 wherein the transponder further comprises an integrated circuit chip having antennae that is used to access a memory device.

7. The data tape storage cartridge of claim 1 wherein the panel and transponder are selectively removable from the housing as a unit and wherein the transponder may be replaced in the panel with an interchangeable transponder.

8. A tape cartridge for a data storage tape that may be used with a tape drive system, the tape drive system having a communication link that reads and writes data to a transponder, the tape cartridge comprising:
   a housing;
   a tape reel rotatably contained within the housing;
   a length of data storage tape wound on the tape reel on which data may be stored for later retrieval;
   a panel secured to the housing in a selectively removable relationship relative to the housing, the panel having a retainer for retaining the transponder, and wherein the panel also supports a tape write protect switch that may be actuated to prevent a tape from being overwritten.

9. The tape cartridge of claim 8 wherein the write protect switch further comprises a manual slide switch that is manually moved between a write position and a write protect position.

10. The tape cartridge of claim 8 wherein a first set of surface features are provided on the panel that cooperate with a second set of surface features on the housing to retain the panel on the housing selectively.

11. The tape cartridge of claim 10 wherein the first set of surface features comprise a pair of steps in opposed sidewalls of the panel and the second set of surface features comprise a pair of spaced ribs formed in the housing along which the steps are permitted to slide as the panel is inserted and removed from the housing.

12. The tape cartridge of claim 11 wherein the first set of surface features further comprise a cam ramp having a locking edge and the second set of surface features further comprise a locking lip over which the cam ramp moves until the locking lip engages the locking edge.

13. The tape cartridge of claim 8 wherein the transponder is retained by the panel in an orientation wherein the transponder communicates through a single planar wall of the panel with the communication link of the tape drive system.

* * * * *